United States Patent
Sheppard et al.

(10) Patent No.: US 11,847,119 B2
(45) Date of Patent: Dec. 19, 2023

(54) METHOD AND SYSTEM FOR ESTIMATING THE CARDINALITY OF INFORMATION

(71) Applicant: The Nielsen Company (US), LLC, New York, NY (US)

(72) Inventors: Michael Sheppard, Holland, MI (US); Edward Murphy, Montville, CT (US); Jonathan Sullivan, Hurricane, UT (US)

(73) Assignee: The Nielsen Company (US), LLC, New York, NY (US)

( * ) Notice: Subject to any disclaimer, the term of this patent is extended or adjusted under 35 U.S.C. 154(b) by 115 days.

(21) Appl. No.: 17/460,666

(22) Filed: Aug. 30, 2021

(65) Prior Publication Data

US 2023/0069313 A1    Mar. 2, 2023

(51) Int. Cl.
| | | |
|---|---|---|
| *G06F 16/2453* | (2019.01) | |
| *G06F 16/2458* | (2019.01) | |
| *G06F 16/23* | (2019.01) | |
| *G06Q 30/0242* | (2023.01) | |
| *G06F 16/951* | (2019.01) | |
| *G06F 16/22* | (2019.01) | |
| *G06N 7/01* | (2023.01) | |

(52) U.S. Cl.
CPC .... *G06F 16/24545* (2019.01); *G06F 16/2255* (2019.01); *G06F 16/2358* (2019.01); *G06F 16/2462* (2019.01); *G06F 16/951* (2019.01); *G06N 7/01* (2023.01); *G06Q 30/0246* (2013.01)

(58) Field of Classification Search
CPC ........... G06F 16/24545; G06F 16/2255; G06F 16/2358; G06F 16/2462; G06F 16/951; G06N 7/01; G06Q 30/0246

USPC .......................................................... 707/713
See application file for complete search history.

(56) References Cited

U.S. PATENT DOCUMENTS

| | | | |
|---|---|---|---|
| 11,074,237 B2 | 7/2021 | Ertl | |
| 2012/0084287 A1 | 4/2012 | Lakshminarayan | |
| 2014/0149433 A1 | 5/2014 | Lakshminarayan | |
| 2015/0269178 A1* | 9/2015 | Rhodes | G06F 16/958 707/700 |

(Continued)

FOREIGN PATENT DOCUMENTS

WO     2021034320 A1    2/2021

OTHER PUBLICATIONS

Written Opinion of the International Searching Authority for corresponding PCT application No. PCT/US2022/041902, dated Dec. 8, 2022.

(Continued)

*Primary Examiner* — Michael Pham
(74) *Attorney, Agent, or Firm* — McDonnell Boehnen Hulbert & Berghoff LLP

(57) ABSTRACT

A computer-implemented method for efficiently estimating the number of unique elements in a collection of elements comprises generating, via hash logic, hash values for each element of the collection of elements. The method further comprises specifying, in a sketch-frequency table, a set of discrete statistical values associated with the hash values and, for each discrete statistical value of the set of discrete statistical values, information indicative of a frequency at which binary representations of the hash values are associated with the discrete statistical value. The cardinality of the collection of elements is estimated based on the sketch-frequency table.

20 Claims, 6 Drawing Sheets

(56) References Cited

U.S. PATENT DOCUMENTS

2019/0384830 A1    12/2019  Nazi
2021/0359846 A1*   11/2021  Wright .................. H04L 9/0643

OTHER PUBLICATIONS

Ting, Daniel. "Streamed Approximate Counting of Distinct Elements", Proceedings of the 20th ACM SIGKDD International conference on Knowledge discovery and data mining. 2014, 10 pages. (https://research.fb.com/publications/streamed-approximate-counting-of-distinct-elements).
Cohen, Edith. "All-distances sketches, revisited: HIP estimators for massive graphs analysis." IEEE Transactions on Knowledge and Data Engineering 27.9, 2015, 2320-2334. (https://arxiv.org/abs/1306.3284).
Estan, Cristian. "The count distinct problem in the streaming model", Dec. 6, 2007, 3 pages. (http://www.math.wisc.edu/~probsem/06Dec07.pdf).
Cohen, Edith. "Leveraging Big Data: Lecture 3", 2013, 63 pages. (http://www.cohenwang.com/edith/bigdataclass2013/lectures/lecture3.pdf).

* cited by examiner

| data | | $h \to k$ | S | c | $r_k$ | $p^c$ | p |
|---|---|---|---|---|---|---|---|
| — | — | — | 0,0,0,... | 0 | — | 0 | 1 |
| 1* | B | → 0 | 1,0,0,... | 1 | 0.5 | 0.5 | 0.5 |
| 2* | E | [1,1,1,0,...] → 3 | 1,0,0,1,... | 3 | 0.0625 | 0.5625 | 0.4375 |
| 3  | E | [1,1,1,0,...] → 3 | 1,0,0,1,... | 3 | 0.0625 | 0.5625 | 0.4375 |
| 4* | D | [1,0,...] → 1 | 1,1,0,1,... | 5.28571 | 0.25 | 0.8125 | 0.1875 |
| 5  | A | [1,0,...] → 1 | 1,1,0,1,... | 5.28571 | 0.25 | 0.8125 | 0.1875 |
| 6  | E | [1,1,1,0,...] → 3 | 1,1,0,1,... | 5.28571 | 0.25 | 0.8125 | 0.1875 |
| 7  | C | [1,0,...] → 1 | 1,1,0,1,... | 5.28571 | 0.25 | 0.8125 | 0.1875 |
| 8  | C | [1,0,...] → 1 | 1,1,0,1,... | 5.28571 | 0.25 | 0.8125 | 0.1875 |
| 9  | C | [1,0,...] → 1 | 1,1,0,1,... | 5.28571 | 0.25 | 0.8125 | 0.1875 |
| 10 | C | [1,0,...] → 1 | 1,1,0,1,... | 5.28571 | 0.25 | 0.8125 | 0.1875 |

*Fig. 4A*

| $f_k$ | 1 | 6 | 3 |
|---|---|---|---|
| $k$ | 0 | 1 | 3 |

*Fig. 4B*

| Sample | Likelihood | Estimate |
|---|---|---|
| {0,1,3} | 0.0666667 | 7.00000 |
| {0,3,1} | 0.0333333 | 5.28571 |
| {1,0,3} | 0.15 | 6.33333 |
| {1,3,0} | 0.45 | 3.78788 |
| {3,0,1} | 0.0428571 | 4.35238 |
| {3,1,0} | 0.257143 | 3.52121 |

*Fig. 4C*

METHOD AND SYSTEM FOR ESTIMATING THE CARDINALITY OF INFORMATION

BACKGROUND

Field

This application generally relates to information processing systems. In particular, this application describes a method and system for estimating the cardinality of information.

Description of Related Art

Determining the number of individuals that view particular content is of interest in many applications. For instance, a web page operator may want to know the number of individuals that visit a particular web page. The web page operator may use the information for various purposes such as determining hardware requirements of the web page (e.g., processing power, memory, etc.) This information may also facilitate determining a price to charge for hosting advertisement content.

In some instances, the number of different individuals (i.e., as opposed to the total number of visits) may be of further interest to particular advertisers. When the number of visits per day is relatively small, the web page serving system can maintain a list of different individuals that visit the site. When a particular individual visits the web page for the first time, information that identifies the individual (e.g., a cookie) can be added to the list. The number of elements in the list corresponds to the number of different individuals that visited the web page.

However, such a technique is not practical for web pages that receive millions of visits a day.

SUMMARY

In a first aspect, a computer-implemented method for efficiently estimating the number of unique elements in a collection of elements comprises generating, via hash logic, hash values for each element of the collection of elements. The method further comprises specifying, in a sketch-frequency table, a set of discrete statistical values associated with the hash values and, for each discrete statistical value of the set of discrete statistical values, information indicative of a frequency at which the hash values are associated with the discrete statistical value. The cardinality of the collection of elements is estimated based on the sketch-frequency table.

In a second aspect, a computing system includes a memory and a processor. The memory stores instruction code. The processor is in communication with the memory. The instruction code is executable by the processor to cause the computing system to perform operations that include generating, via hash logic, hash values for each element of the collection of elements. The method further comprises specifying, in a sketch-frequency table, a set of discrete statistical values associated with the hash values and, for each discrete statistical value of the set of discrete statistical values, information indicative of a frequency at which the hash values are associated with the discrete statistical value. The cardinality of the collection of elements is estimated based on the sketch-frequency table.

In a third aspect, a non-transitory computer-readable medium having stored thereon instruction code is provided. When the instruction code is executed by a processor, the processor performs operations that comprise generating, via hash logic, hash values for each element of the collection of elements. The method further comprises specifying, in a sketch-frequency table, a set of discrete statistical values associated with the hash values and, for each discrete statistical value of the set of discrete statistical values, information indicative of a frequency at which the hash values are associated with the discrete statistical value. The cardinality of the collection of elements is estimated based on the sketch-frequency table.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 4A illustrates a table that includes a collection of elements, in accordance with example embodiments.

FIG. 4B illustrates a sketch-frequency table associated with a collection of elements, in accordance with example embodiments.

FIG. 4C illustrates a table of the cardinality estimate for different combinations of orders in which a discrete statistical value k can occur, in accordance with example embodiments.

DETAILED DESCRIPTION

Figure 1:
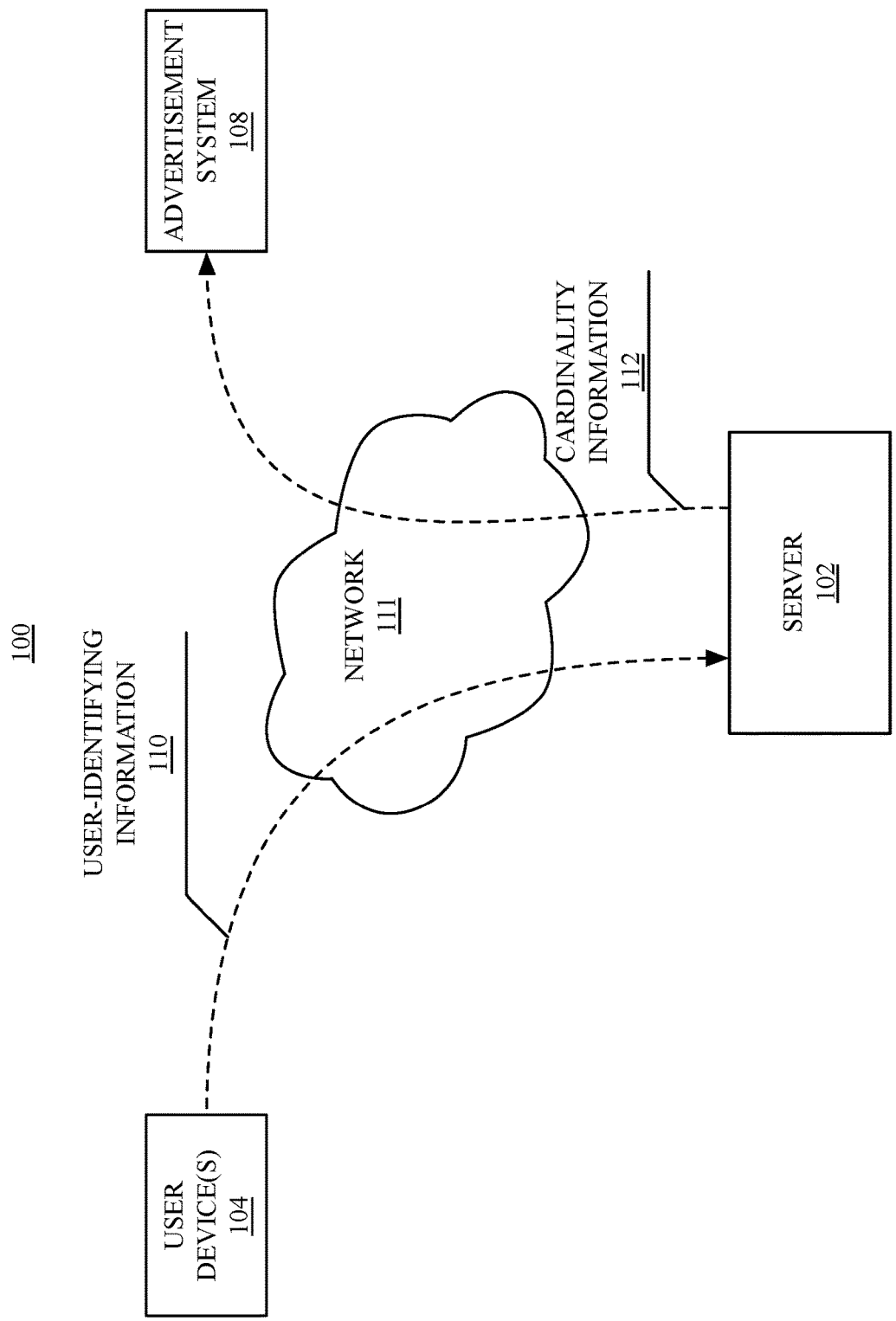
FIG. 1 illustrates an environment that includes various systems/devices that facilitate estimating the cardinality of information, in accordance with example embodiments.

Implementations of this disclosure provide technological improvements that are particular to computer technology, such as those related to reducing hardware resources and power consumption. In this regard, a computing system disclosed herein is configured to efficiently process a large collection of elements to determine the cardinality or number of unique elements in the collection in a computationally efficient manner. For example, methods performed by the computing system significantly reduce the amount of memory and power consumption required by the computing system to process the collection of elements by estimating the cardinality.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

As noted above, for web pages receiving a relatively small number of daily visits, a list of the identifies the different individuals may be maintained. For instance, when a particular individual visits the web page for the first time, information that identifies the individual (e.g., a cookie) can be added to the list. The number of elements in the list corresponds to the number of different individuals that visited the web page. This technique is not, however, practical for web pages that receive millions of visits a day because the size of the list would need to be much larger (i.e., the system would require additional memory), and searching such a list to determine whether a particular individual is already represented in the list could be processor intensive.

However, in many cases, an estimate of the number of different individuals, rather than the exact number, may be suitable. As described in more detail below, the memory requirements and processing power associated with determining an estimate of the number of different individuals is orders of magnitude smaller than the memory requirements and processing power that would otherwise be required to maintain and process the list described above.

FIG. 1 illustrates an example of an environment 100 that includes various systems/devices that facilitate estimating the cardinality of information. Example systems/devices of the environment 100 include user device(s) 104, a server 102, and an advertisement system 108. As described in further detail below, the user device(s) 104 are configured to communicate user-identifying information 110 to the server 102. The user-identifying information 110 associated with a particular user is sometimes referred to herein as an element, and user-identifying information 110 associated with several user devices (s) or users is referred to herein as a collection of elements.

In response to receiving this information, the server 102 is configured to determine cardinality information 112 associated with the user-identifying information 110 and, in some examples, communicate the cardinality information 112 to the advertisement system 108. In an example, the user device(s) 104, server 102, and advertisement system 108 communicate information to one another via a communication network 111, such as the Internet, a cellular communication network, a WiFi network, etc.

Figure 2:
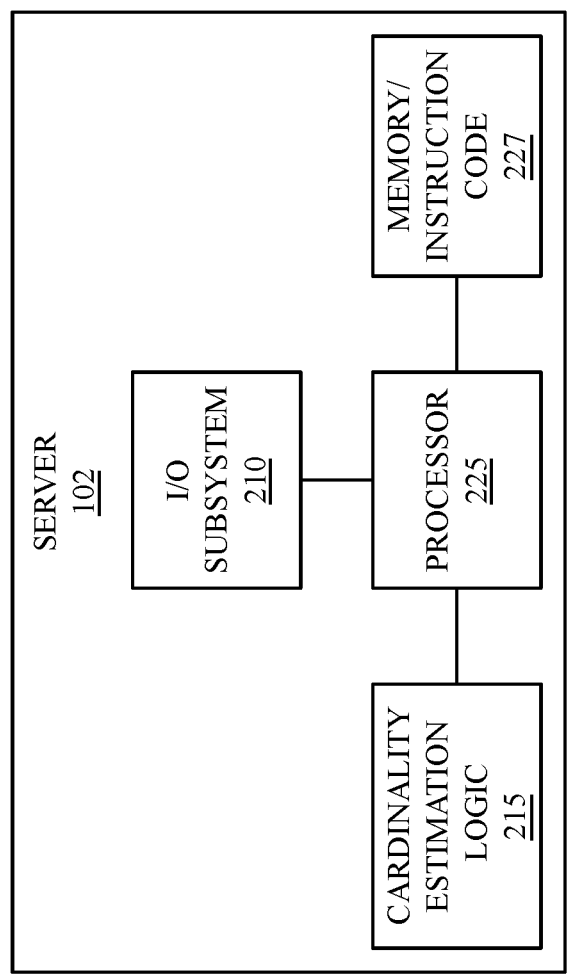
FIG. 2 illustrates a server, in accordance with example embodiments.

FIG. 2 illustrates an example of a server 102. An example of the server 102 includes a memory 227 and a processor 225. An example of server 102 also includes an input/output (I/O) subsystem 210, and cardinality estimation logic 215.

An example of the processor 225 is in communication with the memory 227. The processor 225 is configured to execute instruction code stored in the memory 227. The instruction code facilitates performing, by the server 102, various operations that are described below. In this regard, the instruction code can cause the processor 225 to control and coordinate various activities performed by the different subsystems of the server 102. The processor 225 can correspond to a stand-alone computer system such as an Intel®, AMD®, or PowerPC® based computer system or a different computer system and can include application-specific computer systems. The computer system can include an operating system, such as Linux, Unix®, or a different operating system.

An example of the I/O subsystem 210 includes one or more input/output interfaces configured to facilitate communications with entities outside of the server 102. An example of the I/O subsystem 210 is configured to communicate information via a RESTful API or a Web Service API. An example of I/O subsystem 210 implements a web browser to facilitate generating one or more web-based interfaces through which users of the server 102, the user device(s) 104, and/or other systems interact with the server 102.

An example of the I/O subsystem 210 includes communication circuitry configured to facilitate communicating information to and from the server 102. An example of the communication circuitry facilitates wired and/or wireless communication. For instance, an example of the communication circuitry facilitates communicating information via a wired and/or wireless Internet connection. An example of the communication circuitry facilitates communicating information via a cellular telephone network such as a 3G, 4G, and/or 5G network. Other examples of the communication circuitry facilitate communication of information via an 802.11 based network, Bluetooth®, Zigbee®, near field communication technology, or a different wired or wireless network.

An example of the cardinality estimation logic 215 is configured to receive user-identifying information 110 (e.g., collection of elements) that is received by the server 102 and to estimate the cardinality or number of unique elements in the user-identifying information 110 (e.g., the number of different individuals represented by the information). In an example, the cardinality estimation logic 215 updates the cardinality estimate whenever the user-identifying information 110 specifies an element (e.g., particular individual) that is not already represented within the cardinality estimate. For instance, some examples of the user-identifying information 110 are specified in an information stream that is associated with individuals visiting a web page of the server 102. As individuals visit the web page, user-identifying information 110 associated with these individuals is passed to the cardinality estimation logic 215 to facilitate updating the cardinality estimate. In an example, the cardinality estimate is specified in cardinality information 112 that is output from the cardinality estimation logic 215.

Figure 3:
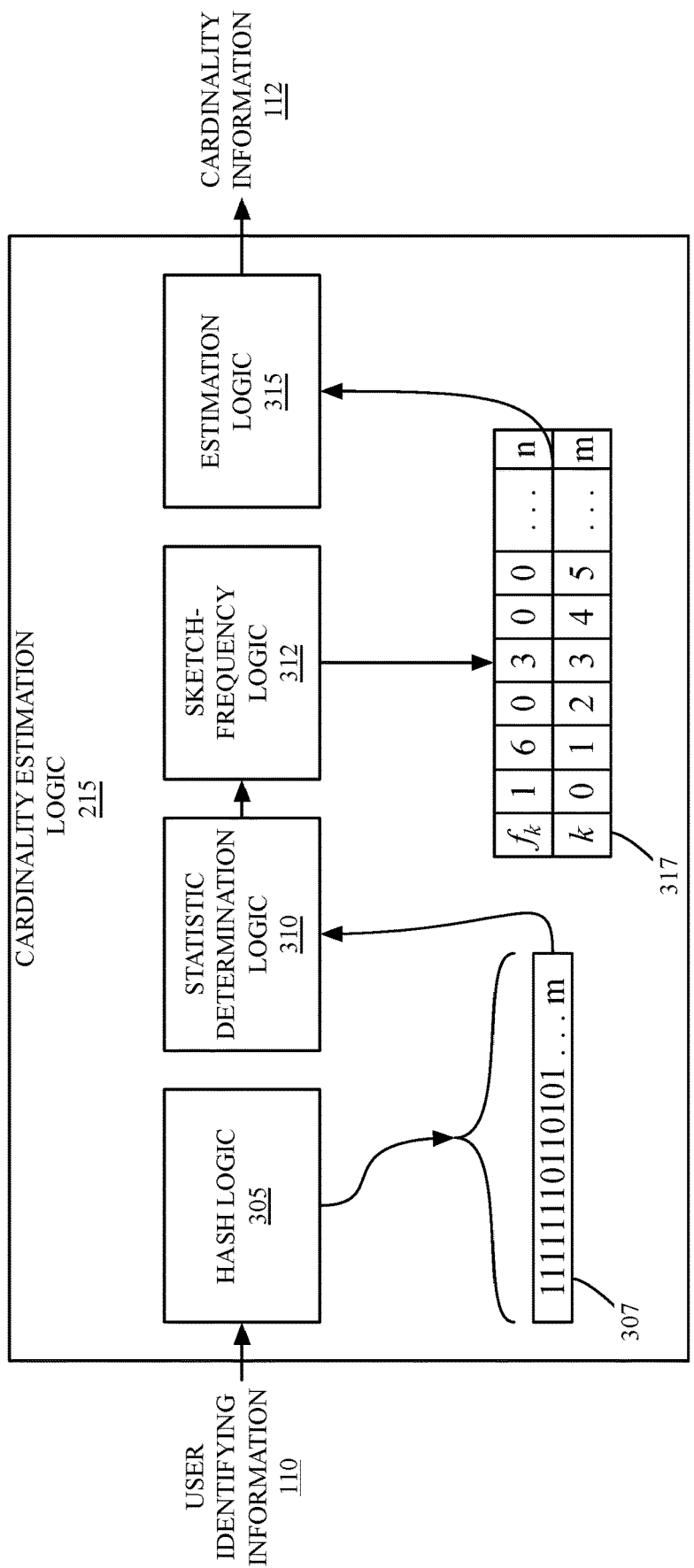
FIG. 3 illustrates cardinality estimation logic, in accordance with an example embodiments.

FIG. 3 illustrates an example of cardinality estimation logic 215 of the server 102. The cardinality estimation logic 215 includes hash logic 305, statistic determination logic 310, sketch-frequency logic 312, and estimation logic 315.

Examples of the hash logic 305 are configured to generate hash values associated with the elements of the user identifying information 110 (e.g., cookies, email addresses, names, etc., associated with individuals). Examples of the hash values can be expressed in any numeral system. Some examples of the hash values are expressed as binary numerals and specify bit positions (e.g., bit 0, bit 1, ..., $bit_m$) within an array of bits 307 of size m. Other examples of the hash values are expressed as Hexadecimal, Octal, etc. In some examples, hash values output from the hash logic 305 conform to a uniform distribution so that the bits associated with the hash values tend to be uniformly distributed across the array of bits 307. In other examples, hash values output from the hash logic 305 conform to a geometric distribution such that bit positions of the array of bits 307 corresponding to lower orders bits are more likely to be generated by the hash logic 305 than bit positions corresponding to higher-order bits.

Examples of the statistic determination logic 310 are configured to determine discrete statistics of interests associated with the hash values. These discrete statistics of interests facilitate computing an update probability (e.g., a probability that an estimated cardinality will change upon the processing of another element). In this regard, some examples of the statistic determination logic 310 are configured to determine discrete statistical values associated with binary representations of the hash values generated above. In some examples, the discrete statistical value for a particular binary representation corresponds to a number of consecutive ones in the binary representation starting from the least significant bit (LSB). In these examples, the number of consecutive ones associated with various binary representations of the hash value define a geometric distribution.

In some examples, the discrete statistical value for a particular binary representation corresponds to a Hamming weight of the binary representation. An example of the Hamming weight corresponds to the sum of the ones present in the binary representation. In these examples, the sum of the ones associated with various binary representations of the hash value define a binomial distribution. In some examples, the statistic determination logic 310 is configured to iterate over the entire length of the array of bits 307 and increment a counter for each bit that is set to one to determine the Hamming weight.

Examples of the sketch-frequency logic 312 are configured to determine information indicative of a frequency at which the hash values are associated with the discrete statistical values determined above and to generate a sketch-frequency table 317 that concisely represents the collection of elements in a memory-efficient manner. The sketch-frequency table 317 facilitates the determination of the cardinality of the collection of elements without having to iterate over the collection of elements multiple times.

In some examples, elements of a row of the sketch-frequency table 317 correspond to the different possible values of the discrete statistical value k associated with the collection of elements. For instance, as an example, when a binary representation of the hash value is used, and the discrete statistical value k represents the number of consecutive ones starting from the LSB of the binary representation of the hash, elements of the first row may be 0, 1, 2, 3, ..., m to indicate zero bits, one consecutive bit, two consecutive bits, three consecutive bits, etc. As another example, when a binary representation of the hash value is used, and the discrete statistical value k corresponds to the Hamming weight, elements of the first row may be 0, 1, 2, 3, ..., m to indicate the sum of 1's is zero, 1, 2, 3, etc.

In some examples, elements of another row of the sketch-frequency table 317 correspond to the number of times/frequency with hash values are associated with the corresponding discrete statistical values. I.e., the number of times an element in the collection of elements was hashed to a particular discrete statistical value k. For instance, example elements of the second row can correspond to 1, 6, 0, 3, 0, 0, etc., to indicate that discrete statistical value zero was hashed once, discrete statistical value 1 was hashed six times, and discrete statistical value three was hashed three times. The count associated with the other discrete statistical values is zero and indicates that these discrete statistical values were not encountered during hashing of the elements.

Some examples of the estimation logic 315 estimate the cardinality of the collection of elements (e.g., estimate the number of unique elements) based on the set of discrete statistical values and the counts/frequencies associated with the discrete statistical values specified in the sketch-frequency table 317. In this regard, some examples of the estimation logic 315 are configured to initialize a running value of the estimated cardinality to zero and then to iterate over each discrete statistical value specified in the sketch-frequency table 317. During each iteration, the estimation logic 315 is configured to determine an update-probability indicative of a probability that future iterations will update the running value of the cardinality and increment the value of the cardinality by the reciprocal of the update-probability associated with the immediately prior iteration.

In some examples, the estimation logic 315 is configured to estimate the cardinality of the collection of elements by estimating a first cardinality associated with a first order of the discrete statistical values and a first probability that the first order of the discrete statistical values would have occurred in the first order. The estimation logic 315 then estimates a second cardinality associated with a second order of the discrete statistical values that is different from the first order of the discrete statistical values and a second probability that the second order of the discrete statistical values would have occurred in the second order. The estimation logic 315 then estimates the cardinality of the collection of elements as a weighted sum of the first estimated cardinality and the second estimated cardinality weighted, respectively, according to the first probability and the second probability.

As noted above, examples of cardinality estimation logic 215 estimate the cardinality of the collection of elements without having to iterate over the collection of elements multiple times. For example, a single iteration over the collection of elements facilitates the generation of the sketch-frequency table 317. The sketch-frequency table 317, which has a much smaller memory footprint than the collection of elements, can be iterated over multiple times and in various orders by the estimation logic 315 to estimate the cardinality. This, in turn, vastly reduces the computational overhead required to estimate the cardinality of the collection of elements.

FIG. 4A illustrates a table 400 that helps elucidate some of the aspects described above. The data column of the table 400 specifies the different elements of the collection of elements that are processed, where the element in the first row is processed first, the element in the second row is processed second, etc. The elements represent the user identifying information 110 (e.g., A represents a first user, B represents a second user, etc.). The h column of the table 400 specifies the bit representation of the hash value associated with the element. Column k of the table 400 specifies the discrete statistical value associated with the corresponding hash value, which in this case corresponds to the number of consecutive 1's starting from the LSB of the bit representation. The S column of the table 400 specifies the sketch associated with the collection of elements. Each bit of S is associated with a particular discrete statistical value (e.g., bit 0 corresponds to a discrete statistical value 0, bit 1 corresponds to a discrete statistical value 1, etc.). The c column of the table 400 specifies the estimate of the cardinality estimated during a particular iteration. The $r_k$ column of the table 400 specifies the probability of the hash value starting with k initial 1's and corresponds to a geometric distribution with $\rho=\frac{1}{2}$ evaluated at k. The $p^c$ column of the table 400 corresponds to the running total of $r_k$. The p column of the table 400 corresponds to the complement probability of $p^c$ and specifies the probability that the sketch can be modified in future iterations.

As indicated, parameters S, c, and $p^c$ are initially set to zero, and p is set to one. Next, element B is received and hashed to a bit representation having zero consecutive 1's starting from the LSB of the bit representation. Discrete statistical value k, therefore, is zero and bit zero of S is set. This results in $r_k=0.5$, $p^c=0.5$, and p=0.5. Since p changed from 1 to 0.5, c is set to 1. Element E is received next and hashed to a bit representation having three consecutive 1's starting from the LSB of the bit representation. Discrete statistical value k, therefore, is three and bit three of S is set. This results in $r_k=0.0625$, $p^c=0.5625$, and p=0.4375. Since p changed from 0.5 to 0.4375, c is incremented by 1/0.5 to 3. Element E is then received again and hashed to a bit representation having three consecutive 1's starting from the LSB of the bit representation. The discrete statistical value k, therefore, is three. Since this value was previously seen (as indicated by the bit being set in S), the relevant parameters remain unchanged. Element D is received next and hashed to a bit representation having one consecutive 1's starting from the LSB of the bit representation. Discrete statistical value k, therefore, is one and bit one of S is set. This results in $r_k=0.25$, $p^c=0.8125$, and p=0.1875. Since p changed from 0.4375 to 0.8125, c is incremented by 1/0.4375 to 5.28571. Additional elements are received after the fourth iteration but do not result in any new values of k. Therefore, the cardinality, c, for the collection of elements is estimated to be 5.28571.

As indicated above, the estimated cardinality only changes when new discrete statistical values are determined. The elements associated with new/first-time observed discrete statistical values are indicated with an asterisk. Therefore, one only needs to know the different discrete statistical values that were encountered and the corresponding order in which they were encountered to determine the cardinality of the collection of elements. In the example above, the discrete statistical values and the order in which they occur correspond to {0, 3, 1}. Performing the operations above on just these three discrete statistical values and in this particular order results in an estimated cardinality of value 5.28571, which is the same as the cardinality determined after processing the elements of all the rows of the table 400 in FIG. 4.

It should be noted that had the elements been iterated over in a different order, the estimated cardinality would have been different. The likelihood that a particular order will occur can be determined based on the frequency with which particular discrete statistical values of k are encountered. The particular probability associated with a particular order of the discrete statistical values can be determined based on sampling without replacement of frequencies associated with discrete statistical values. This aspect is discussed further below.

FIG. 4B illustrates a sketch-frequency table 405 associated with the collection of elements specified in the table 400 of FIG. 4A. As shown, k=0 (i.e., statistical value) occurred once, k=1 occurred six times, and k=3 occurred three times. This information facilitates determining the likelihood that the particular order of k values will occur. For instance, the likelihood that the order {0, 3, 1} of k values will be encountered can be determined as:

$$\left(\frac{1}{1+6+3}\right)\left(\frac{3}{6+3}\right)\left(\frac{6}{6}\right) = 0.0333333$$

The likelihood that the order {3, 1, 0} of k values is will be encountered can be determined as:

$$\left(\frac{3}{1+6+3}\right)\left(\frac{6}{6+1}\right)\left(\frac{1}{1}\right) = 0.257143$$

FIG. 4C illustrates a table 410 of the cardinality estimate for all the different combinations of orders in which k can occur and the likelihoods associated with the corresponding cardinality estimates. The weighted average of the cardinality estimates of the table 410 is 4.38939. It can be shown that this estimate would have matched the long-term frequency proportions in a Monte Carlo simulation of repeated sampling of the elements of the collection of elements.

It should be noted that the number of different orders in which k can occur can become high relatively quickly for even a relatively small number of different possible orders (e.g., 10 different sketch values=10! orders and corresponding frequencies). Therefore, in some examples, the weighted average can be determined based on a subset of the various possible orders (e.g., 10000). Particular orders to select can be based on a Monte Carlo simulation. This value that is determined should converge to the weighted average of each unique estimate.

While the manner in which the cardinality estimation logic 215 estimates the cardinality of a collection of elements has been described by way of certain examples, the general formulation, for a discrete distribution to allow the frequency counting described above, can be written as follows:

Frequency Count Sketch:

With a uniform hash function h with n bits, let $f_k$ be the frequency count of the number of entries with the sketch value of k for the statistic under interest.

Cardinality Estimator:

$(k_{(1)}, \ldots, k_{(m)})$=Random Sample Without Replacement with value k having weight $f_k$. Note, the sample produces a list of m unique sketch values in some particular order. This replicates the order of values which would have changed the sketch in a stream with entries permuted.

$(p_{(1)}, \ldots, p_{(m)})$=Update probability.

Under distribution D in which the statistic under interest is based upon, the probability the sketch would be updated right before each value has been observed. i.e., $p_{(1)}=1$ Cardinality Estimate=$\Sigma_{i=1}^{m} p_i^{-1}$ Note, this corresponds to a Martingale Estimator on a probabilistically replicated stream under a new permutation. I.e., the total of inverse probabilities within the list of values.

As noted above, the sketch/frequency table 405 in FIG. 4B concisely represents the collection of elements in a way that facilitates the determination of the cardinality of the collection of elements without having to iterate over the collection of elements multiple times. In some examples, sketch-frequency tables 405 associated with different collections of elements can be merged into a new sketch-frequency table 405 that facilitates the determination of the cardinality of the combined collections of elements. An example of the merging involves inserting in the merged table the values of k specified in the two tables and adding the corresponding counts/frequencies together in the merged table. For example, if a value of k=3 is specified in the first table with a count/frequency of 5, and the same value of k (i.e., k=3) is specified in the second table with a count/frequency of 10, then the merged table specifies a value k=3 having a count/frequency of 15.

Examples of the server 102 utilize the techniques described above to estimate the number of individuals that clicked on particular advertisements hosted by the server 102. In some cases, the server 102 can determine a cost-per-click to associate with the particular advertisement as a function of the estimated number of individuals that clicked on the particular advertisements. For example, an operator can increase the cost-per-click associated advertisements that receive clicks from a large number of different individuals and can decrease the cost-per-click associated with those advertisements that do not receive as many clicks from different individuals.

In some examples, the sketch-frequency table 405 associated with a particular collection of elements is specified in cardinality information 112 that is output from the cardinality estimation logic 215 and by the server 102. In this case, as an example, an advertisement system 108 can estimate the cardinality of the collection of elements processed by the server 102. In this regard, the advertisement system 108 can receive sketch-frequency tables 405 from various servers 102 and merge the sketch-frequency tables 405, as described above. The advertisement system 108 can then estimate the cardinality associated with the collection of elements processed by all of the servers 102. In examples, this gives the advertisement system 108 an estimate of the number of unique/different individuals that visited the various servers 102.

The techniques described above for determining cardinality can be used to elucidate other aspects associated with the collection of elements.

Figure 5:
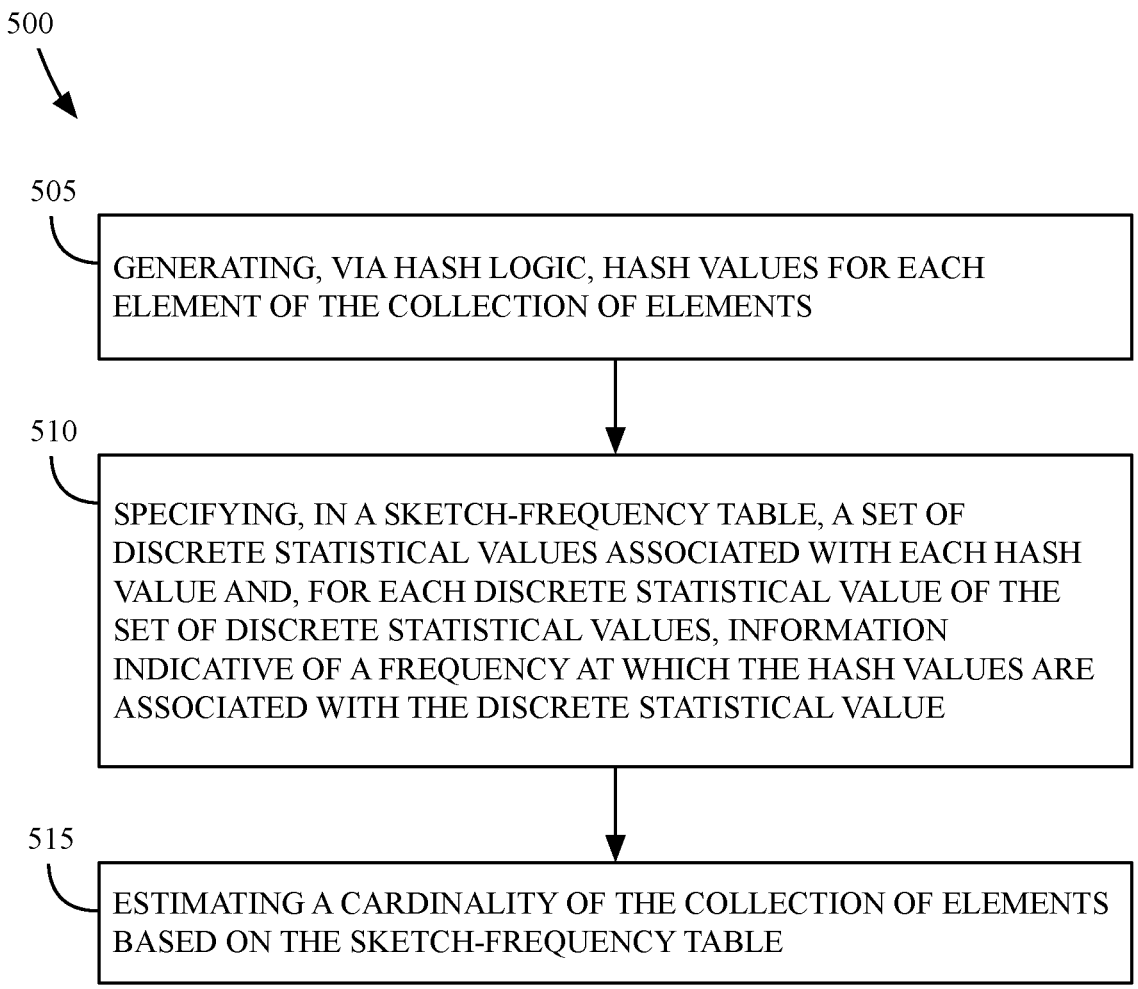
FIG. 5 illustrates a method that can be performed by one or more systems or devices, in accordance with example embodiments.

FIG. 5 illustrates an example of a method 500 that can be performed by one or more systems or devices described herein. Block 505 involves generating, via hash logic 305, hash values for each element of the collection of elements.

Block 510 involves specifying, in a sketch-frequency table 317, a set of discrete statistical values associated with the hash values and, for each discrete statistical value of the set of discrete statistical values, information indicative of a frequency at which the hash values are associated with the discrete statistical value.

Block 515 involves estimating the cardinality of the collection of elements based on the sketch-frequency table.

In some examples of the method, specifying, in the sketch-frequency table 317, the set of discrete statistical values associated with hash values involves generating binary representations of the hash values. For each binary representation, the discrete statistical value is determined to correspond to a number of consecutive ones in the binary representation starting from a least significant bit. The set of discrete statistical values associated with the binary representations define a geometric distribution.

In some examples of the method, specifying, in the sketch-frequency table 317, the set of discrete statistical values associated with hash values involves generating binary representations of the hash values. For each binary representation, the discrete statistical value is determined to correspond to a Hamming weight of the binary representation. The set of discrete statistical values associated with the binary representations define a binomial distribution.

In some examples of the method, estimating the cardinality of the collection of elements involves iterating over the collection of elements a single time.

In some examples of the method, estimating the cardinality of the collection of elements based on the sketch-frequency table 317 involves estimating a first cardinality associated with a first order of the discrete statistical values specified in the sketch-frequency table 317 and a first probability that the first order of the discrete statistical values would have occurred in the first order. The method further involves estimating a second cardinality associated with a second order of the discrete statistical values specified in the sketch-frequency table 317 that is different from the first order of the discrete statistical values and a second probability that the second order of the discrete statistical values would have occurred in the second order. The cardinality of the collection of elements is estimated as a weighted sum of the first estimated cardinality and the second estimated cardinality weighted, respectively, according to the first probability and the second probability.

In some examples of the method, estimating the cardinality of the collection of elements based on the sketch-frequency table involves generating a plurality of cardinality estimates associated with a plurality of different orders of the set of discrete statistical values specified in the sketch-frequency table. At least some of the generated plurality of cardinality estimates are then selected according to a Monte Carlo analysis and without replacement. The cardinality of the collection of elements is estimated as the arithmetic average of the selected cardinality estimates.

In some examples of the method, estimating the cardinality of the collection of elements based on the sketch-frequency table 317 involves initializing a running value of the cardinality to zero; iterating over each discrete statistical value specified in the sketch-frequency table; and determining, during each iteration, an update-probability indicative of a probability that future iterations will update the running value of the cardinality. If the update-probability associated with a current iteration is different from the update-probability associated with an immediately prior iteration, the method further involves adding to the running value of the cardinality a reciprocal of the update-probability associated with the immediately prior iteration.

In some examples of the method, generating hash values for each element of the collection of elements involves generating hash values that conform to a uniform distribution.

Some examples of the method involve receiving a first sketch-frequency table 317 associated with a first collection of elements, and receiving a second sketch-frequency table 317 associated with a second collection of elements. The method further involves merging discrete statistical values specified in the first sketch-frequency table 317 and the first sketch-frequency table 317 into a third sketch-frequency table 317, and specifying respective frequencies for each discrete statistical value in the third sketch-frequency table 317 as a sum of corresponding frequencies of discrete statistical values specified in the first sketch-frequency table 317 and the first sketch-frequency table 317. The cardinality of the combined elements of the first collection of elements and the second collection of elements is estimated based on the third sketch-frequency table 317.

In some examples, the method is performed by a server 102 and elements of the collection of elements are associated with one or more individuals. These examples facilitate estimating the number of individuals that visited the server 102.

Some examples further involve estimating a number of individuals that clicked on particular advertisements hosted by the server 102, and determining a cost-per-click associated with the particular advertisement as a function of the estimated number of individuals that clicked on the particular advertisements.

Figure 6:
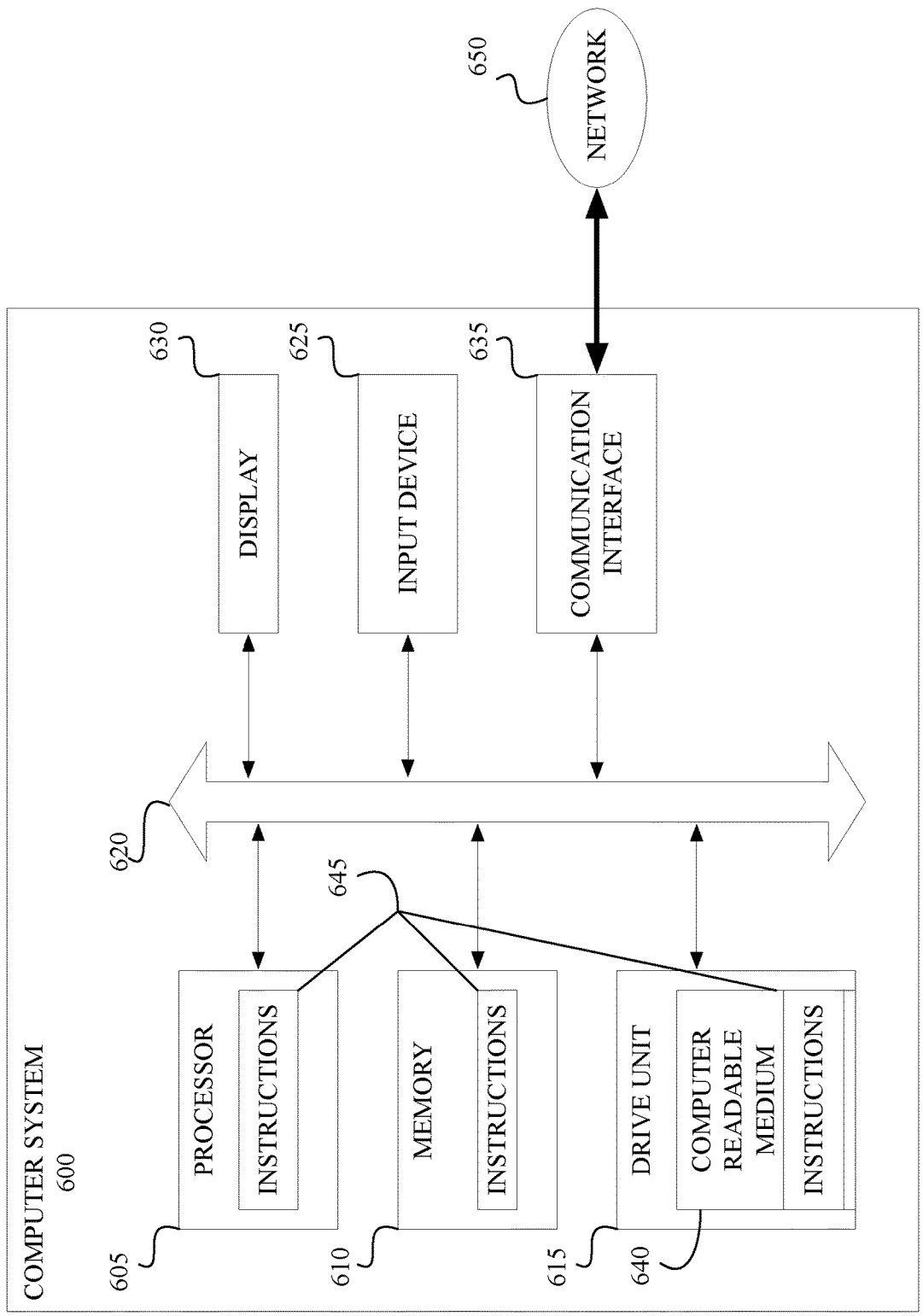
FIG. 6 illustrates a computer system that can form part of or implement any of the systems or devices of the environment, in accordance with example embodiments.

FIG. 6 illustrates an example of a computer system 600 that can form part of or implement any of the systems and/or devices described above. The computer system 600 can include a set of instructions 645 that the processor 605 can execute to cause the computer system 600 to perform any of the operations described above. An example of the computer system 600 can operate as a stand-alone device or can be connected, e.g., using a network, to other computer systems or peripheral devices.

In a networked example, the computer system 600 can operate in the capacity of a server or as a client computer in a server-client network environment, or as a peer computer system in a peer-to-peer (or distributed) environment. The computer system 600 can also be implemented as or incorporated into various devices, such as a personal computer or a mobile device, capable of executing instructions 645 (sequential or otherwise), causing a device to perform one or more actions. Further, each of the systems described can include a collection of subsystems that individually or jointly execute a set, or multiple sets, of instructions to perform one or more computer operations.

The computer system 600 can include one or more memory devices 610 communicatively coupled to a bus 620 for communicating information. In addition, code operable to cause the computer system to perform operations described above can be stored in the memory 610. The memory 610 can be random-access memory, read-only memory, programmable memory, hard disk drive, or any other type of memory or storage device.

The computer system 600 can include a display 630, such as a liquid crystal display (LCD), a cathode ray tube (CRT), or any other display suitable for conveying information. The display 630 can act as an interface for the user to see processing results produced by processor 605.

Additionally, the computer system 600 can include an input device 625, such as a keyboard or mouse or touchscreen, configured to allow a user to interact with components of system 600.

The computer system 600 can also include a disk or optical drive unit 615. The drive unit 615 can include a computer-readable medium 640 in which the instructions 645 can be stored. The instructions 645 can reside completely, or at least partially, within the memory 610 and/or within the processor 605 during execution by the computer system 600. The memory 610 and the processor 605 also can include computer-readable media, as discussed above.

The computer system 600 can include a communication interface 635 to support communications via a network 650. The network 650 can include wired networks, wireless networks, or combinations thereof. The communication interface 635 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A computer-implemented method for efficiently estimating a number of unique elements in a collection of elements, the method comprising:
   generating, via hash logic, hash values for each element of the collection of elements;
   specifying, in a sketch-frequency table, a set of discrete statistical values associated with the hash values and, for each discrete statistical value of the set of discrete statistical values, information indicative of a frequency at which the hash values are associated with the discrete statistical value, wherein specifying, in the sketch-frequency table, the set of discrete statistical values associated with the hash values comprises (a) generating binary representations of the hash values and (b) determining, for each binary representation, a discrete statistical value corresponding to (i) a number of consecutive ones in the binary representation starting from a least significant bit or (ii) a Hamming weight of the binary representation; and
   estimating a cardinality of the collection of elements based on the sketch-frequency table.

2. The computer-implemented method according to claim 1,
   wherein if the discrete statistical value corresponds to the number of consecutive ones in the binary representation starting from a least significant bit, the set of discrete statistical values associated with the binary representations defines a geometric distribution.

3. The computer-implemented method according to claim 1,
wherein if the discrete statistical value corresponds to the Hamming weight of the binary representation, the set of discrete statistical values associated with the binary representations defines a binomial distribution.

4. The computer-implemented method according to claim 1, wherein estimating the cardinality of the collection of elements comprises iterating over the collection of elements a single time.

5. The computer-implemented method according to claim 1, wherein estimating the cardinality of the collection of elements based on the sketch-frequency table comprises:
generating a plurality of cardinality estimates associated with a plurality of different orders of the set of discrete statistical values specified in the sketch-frequency table;
selecting, according to a Monte Carlo analysis and without replacement, at least some of the generated plurality of cardinality estimates; and
estimating the cardinality of the collection of elements as an arithmetic average of selected cardinality estimates.

6. The computer-implemented method according to claim 1, wherein estimating the cardinality of the collection of elements based on the sketch-frequency table comprises:
initializing a running value of the cardinality to zero;
iterating over each discrete statistical value specified in sketch-frequency table;
determining, during each iteration, an update-probability indicative of a probability that future iterations will update the running value of the cardinality;
if the update-probability associated with a current iteration is different from the update-probability associated with an immediately prior iteration, adding to the running value of the cardinality a reciprocal of the update-probability associated with the immediately prior iteration.

7. The computer-implemented method according to claim 1, wherein generating hash values for each element of the collection of elements comprises:
generating hash values that conform to a uniform distribution.

8. The computer-implemented method according to claim 1, further comprising:
receiving a first sketch-frequency table associated with a first collection of elements;
receiving a second sketch-frequency table associated with a second collection of elements;
merging discrete statistical values specified in the first sketch-frequency table and the second sketch-frequency table into a third sketch-frequency table;
specifying respective frequencies for each discrete statistical value in the third sketch-frequency table as a sum of corresponding frequencies of discrete statistical values specified in the first sketch-frequency table and the second sketch-frequency table; and
estimating a cardinality of combined elements of the first collection of elements and the second collection of elements based on the third sketch-frequency table.

9. The computer-implemented method according to claim 1, wherein the method is performed by a server, wherein elements of the collection of elements are associated with one or more individuals, wherein the computer-implemented method facilitates estimating a number of individuals that visited the server.

10. The computer-implemented method according to claim 9, further comprising estimating a number of individuals that clicked on particular advertisements hosted by the server, and determining a cost-per-click associated with the particular advertisement as a function of the estimated number of individuals that clicked on the particular advertisements.

11. A computing system:
one or more processors; and
a memory in communication with the one or more processors, wherein the memory stores instruction code that, when executed by the one or more processors, causes the computing system to perform operations comprising:
generating, via hash logic, hash values for each element of a collection of elements;
specifying, in a sketch-frequency table, a set of discrete statistical values associated with the hash values and, for each discrete statistical value of the set of discrete statistical values, information indicative of a frequency at which the hash values are associated with the discrete statistical value, wherein specifying, in the sketch-frequency table, the set of discrete statistical values associated with the hash values comprises (a) generating binary representations of the hash values and (b) determining, for each binary representation, a discrete statistical value corresponding to (i) a number of consecutive ones in the binary representation starting from a least significant bit or (ii) a Hamming weight of the binary representation; and
estimating a cardinality of the collection of elements based on the sketch-frequency table.

12. The computing system according to claim 11, wherein if the discrete statistical value corresponds to the number of consecutive ones in the binary representation starting from a least significant bit, the set of discrete statistical values associated with the binary representations defines a geometric distribution.

13. The computing system according to claim 11,
wherein if the discrete statistical value corresponds to the Hamming weight of the binary representation, the set of discrete statistical values associated with the binary representations defines a binomial distribution.

14. The computing system according to claim 11, wherein estimating the cardinality of the collection of elements comprises iterating over the collection of elements a single time.

15. The computing system according to claim 11, wherein estimating the cardinality of the collection of elements based on the sketch-frequency table comprises:
generating a plurality of cardinality estimates associated with a plurality of different orders of the set of discrete statistical values specified in the sketch-frequency table;
selecting, according to a Monte Carlo analysis and without replacement, at least some of the generated plurality of cardinality estimates; and
estimating the cardinality of the collection of elements as an arithmetic average of selected cardinality estimates.

16. The computing system according to claim 11, wherein estimating the cardinality of the collection of elements based on the sketch-frequency table comprises:
initializing a running value of the cardinality to zero;
iterating over each discrete statistical value specified in sketch-frequency table;

determining, during each iteration, an update-probability indicative of a probability that future iterations will update the running value of the cardinality;

if the update-probability associated with a current iteration is different from the update-probability associated with an immediately prior iteration, adding to the running value of the cardinality a reciprocal of the update-probability associated with the immediately prior iteration.

17. The computing system according to claim 11, further comprising:

receiving a first sketch-frequency table associated with a first collection of elements;

receiving a second sketch-frequency table associated with a second collection of elements;

merging discrete statistical values specified in the first sketch-frequency table and the second sketch-frequency table into a third sketch-frequency table;

specifying respective frequencies for each discrete statistical value in the third sketch-frequency table as a sum of corresponding frequencies of discrete statistical values specified in the first sketch-frequency table and the second sketch-frequency table; and estimating a cardinality of combined elements of the first collection of elements and the second collection of elements based on the third sketch-frequency table.

18. A non-transitory computer-readable medium having stored thereon instruction code that, when executed by one or more processors of a computing system, causes the computing system to perform operations comprising:

generating, via hash logic, hash values for each element of a collection of elements;

specifying, in a sketch-frequency table, a set of discrete statistical values associated with binary representations of the hash values and, for each discrete statistical value of the set of discrete statistical values, information indicative of a frequency at which binary representations of the hash values are associated with the discrete statistical value, wherein specifying, in the sketch-frequency table, the set of discrete statistical values associated with the hash values comprises (a) generating binary representations of the hash values and (b) determining, for each binary representation, a discrete statistical value corresponding to (i) a number of consecutive ones in the binary representation starting from a least significant bit or (ii) a Hamming weight of the binary representation; and estimating a cardinality of the collection of elements based on the sketch-frequency table.

19. The non-transitory computer-readable medium according to claim 18, wherein estimating the cardinality of the collection of elements based on the sketch-frequency table comprises:

generating a plurality of cardinality estimates associated with a plurality of different orders of the set of discrete statistical values specified in the sketch-frequency table;

selecting, according to a Monte Carlo analysis and without replacement, at least some of the generated plurality of cardinality estimates; and estimating the cardinality of the collection of elements as an arithmetic average of selected cardinality estimates.

20. The non-transitory computer-readable medium according to claim 18, wherein estimating the cardinality of the collection of elements based on the sketch-frequency table comprises:

initializing a running value of the cardinality to zero;

iterating over each discrete statistical value specified in sketch-frequency table;

determining, during each iteration, an update-probability indicative of a probability that future iterations will update the running value of the cardinality;

if the update-probability associated with a current iteration is different from the update-probability associated with an immediately prior iteration, adding to the running value of the cardinality a reciprocal of the update-probability associated with the immediately prior iteration.

* * * * *